United States Patent
Barchers

(10) Patent No.: US 8,076,624 B1
(45) Date of Patent: Dec. 13, 2011

(54) NON-COOPERATIVE LASER TARGET ENHANCEMENT SYSTEM AND METHOD

(76) Inventor: Jeffrey D. Barchers, Longmont, CO (US)

(*) Notice: Subject to any disclaimer, the term of this patent is extended or adjusted under 35 U.S.C. 154(b) by 713 days.

(21) Appl. No.: 12/234,041

(22) Filed: Sep. 19, 2008

Related U.S. Application Data

(60) Provisional application No. 60/973,622, filed on Sep. 19, 2007.

(51) Int. Cl.
*G01J 1/20* (2006.01)
(52) U.S. Cl. .................. 250/201.9; 356/512; 356/515
(58) Field of Classification Search ............. 250/201.9, 250/332; 356/512–516, 521, 121; 359/846, 359/849
See application file for complete search history.

(56) References Cited

U.S. PATENT DOCUMENTS

| | | | | |
|---|---|---|---|---|
| 5,026,977 | A * | 6/1991 | Hubbard, Jr. ............ | 250/201.9 |
| 5,994,690 | A | 11/1999 | Kulkarni et al. | |
| 6,006,128 | A | 12/1999 | Izatt et al. | |
| 6,053,613 | A | 4/2000 | Wei et al. | |
| 6,452,146 | B1 | 9/2002 | Barchers | |
| 6,648,473 | B2 | 11/2003 | Della Vecchia et al. | |
| 6,683,291 | B2 | 1/2004 | Barchers | |
| 6,934,475 | B2 * | 8/2005 | Stappaerts ............ | 398/121 |
| 7,102,756 | B2 | 9/2006 | Izatt et al. | |
| 7,333,215 | B2 * | 2/2008 | Smith .................. | 356/520 |
| 2005/0232536 | A1 | 10/2005 | 'T Hooft et al. | |
| 2006/0094939 | A1 | 5/2006 | Hendriks et al. | |
| 2007/0176077 | A1 | 8/2007 | Barchers | |

FOREIGN PATENT DOCUMENTS

| | | |
|---|---|---|
| WO | WO2004015402 | 2/2004 |
| WO | WO2004073501 | 9/2004 |
| WO | WO2006078802 | 7/2006 |

OTHER PUBLICATIONS

J. Hardy, J. LeFebvre, and C. Koliopouosis, "Real time atmospheric compensation," Journal of the Optical Society of America, 1977, vol. 67:360-369.
C. A. Primmerman, D. V. Murphy, D. A. Page, B. G. Zollars, and H. T. Barclay, "Compensation of atmospheric optical distortion using a synthetic beacon," Nature, 1991, vol. 353(12):141-143.

(Continued)

*Primary Examiner* — Francis M Legasse, Jr.
(74) *Attorney, Agent, or Firm* — Patent Law Offices of Rick Martin, P.C.

(57) ABSTRACT

A system and method forming near diffraction limited size beacon for adaptive optical system using a temporally partially coherent laser source. Comprises projection of laser beams through turbulent medium having non-cooperative target using combination of adaptive optical system and short temporal coherence length laser source forming controllable focused laser target beacon. Combines adaptive optical system technology using any wavefront sensing technique making complex field measurements with short coherence length and associated broad spectral bandwidth. The partially coherent laser source forms narrow (near diffraction limited) size region of coherent laser light at target. The coherent region of return dominates signal for any measurement technique computing average of field over wavelength bandpass and can be used to pre-compensate either the partially coherent laser beam, a long coherence length beam of different wavelength or wavelength in bandpass, or both. Pre-compensation of the partially coherent laser beam can lead to signal-to-noise ratio enhancements.

5 Claims, 9 Drawing Sheets

OTHER PUBLICATIONS

R. Q. Fugate, D. L. Fried, G. A. Ameer, B. R. Boeke, S. L. Browne, P. H. Roberts, R. E. Ruane, G. A. Tyler, and L. M. Wopat, "Measurement of atmospheric wavefront distortion using scattered light from a laser guide star," Nature, 1991, vol. 353(12):144-146.

J. D. Barchers, D. L. Fried, and D. Link, "Evaluation of the performance of Hartmann sensors in strong scintillation," Applied Optics, Feb. 2002, 41:1012-1021.

J. D. Barchers, D. L. Fried, and D. Link, "Evaluation of the performance of a shearing interferometer in strong scintillation in the absence of additive measurement noise," Applied Optics, Jun. 2002, 41:3674-3683.

J. D. Barchers and T. A. Rhoadarmer, "Evaluation of phase-shifting approaches for a point-diffraction interferometer with the mutual coherence function," Applied Optics, Dec. 2002, 41:7499-7509.

J. D. Barchers and B. L. Ellerbroek, "Improved compensation of atmospheric turbulence induced amplitude and phase distortions by means of multiple near field phase adjustments," Journal of the Optical Society of America A., Feb. 2001, 18:399-411.

J. D. Barchers, "Evaluation of the impact of finite resolution effects on scintillation compensation using two deformable mirrors," Journal of the Optical Society of America A., Dec. 2001, 18:3098-3109.

J. D. Barchers, "Application of the parallel generalized projection algorithm to the control of two finite resolution deformable mirrors," Journal of the Optical Society of America A., Jan. 2002, 19:54-63.

J. D. Barchers, "Convergence rates for iterative vector space projection methods for control of two deformable. mirrors for compensation of both amplitude and phase fluctuations," Applied Optics, Apr. 2002, 41:2213-2218.

J. D. Barchers, "Closed loop stable control of two deformable mirrors for compensation of amplitude and phase fluctuations," Journal of the Optical Society of America A., 2002, 19:926-945.

J. D. Barchers, "Modeling of laser beam control systems using projections onto constraint sets," American Control Conference, Jun. 2004 (Invited Paper). [Note: Paper / Presentation awarded best in session].

M. A. Vorontsov, and V. Kolosov, "Target-in-the-loop beam control: basic considerations for analysis and wavefront sensing," Journal of the Optical Society of America A., 2005, 22:126-141.

M. A. Vorontsov, V. Kolosov, and A. Kohnle, "Adaptive laser beam projection on an extended target: phase and field conjugate precompensation," Journal of the Optical Society of America A., 2007, 24:1975-1993.

D. Merino, C. Dainty, A. Bradu, and A. G. Podoleanu, "Adaptive optics enhanced simultaneous en-face optical coherence tomography and scanning laser opthalmoscopy," Optics Express, 2006, 14(8):3345-3353.

M. A. Vorontsov and V. P. Sivokon, "Stochastic parallel-gradient-descent technique for high-resolution wave-front phase-distortion correction," Journal of the Optical Society of America A., 1998, 15:2745-2758.

M. A. Vorontsov, E. W. Justh, and L. A. Beresnev, "Adaptive optics with advanced phase-contrast technique. I. High-resolution wavefront sensing," Journal of the Optical Society of America A., 2001, 16:1289-1299.

M. A. Vorontsov, E. W. Justh, G. W. Carhart, and L. A. Beresnev, "Adaptive optics with advanced phase-contrast technique. I. High-resolution wave-front control," Journal of the Optical Society of America A., 2001, 16:1300-1311.

* cited by examiner

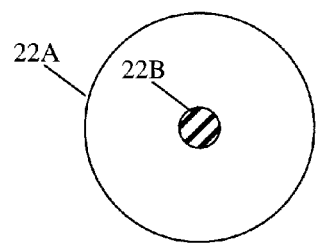
Fig. 8(a)
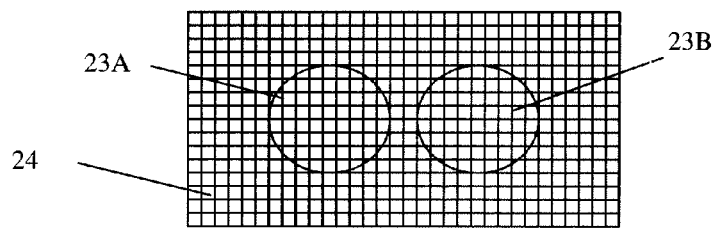
Fig. 8(b)
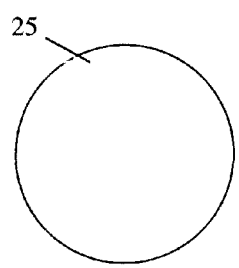 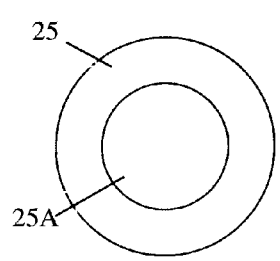 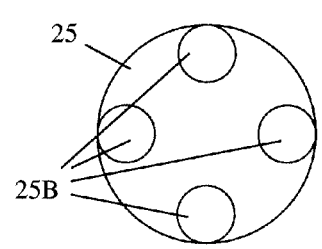
Fig. 9(a)　　　　Fig. 9(b)　　　　Fig. 9(c)

9000

| Fig. Ref. | Wavefront Sensing Laser | Beam Transfer Optics | Beam Steering Device | Phase Correction Device | Wavefront Sensor | Control Algorithm | Mask Technique |
|---|---|---|---|---|---|---|---|
| Figure 5 and 10 Method | Partially Coherent Laser | Any suitable (lenses with sufficient level of achromaticity or reflective optics) | Any method (may include a separate steering mirror for the scoring beam and / or the wavefront sensing beam) | Any suitable device | Any wavefront sensor that produces an average over the complex field in wavelength and over a spatial extent | Any algorithm to compute phase correction device commands given interference data | Optional mask to lead to optimal interference over wavelength at the target |
| Figure 6 and 10 Method | Partially Coherent Laser | Any suitable (lenses with sufficient level of achromaticity or reflective optics) | Any method (may include a separate steering mirror for the scoring beam and / or the wavefront sensing beam) | Any suitable device | Any wavefront sensor that produces an average over the complex field in wavelength and over a spatial extent | Any algorithm to compute phase correction device commands given interference data | Optional mask to lead to optimal interference over wavelength at the target |
| Figure 7, 8, and 11 Method with optional scoring laser | Partially Coherent Laser | All reflective beam transfer optics | Steering Mirror (may include a separate steering mirror for the scoring beam and / or the wavefront sensing beam) | Continuous facesheet conventional piezo deformable mirror (DM) or membrane DM | Figure 7 and 8 Method | Figure 11 Modal Gradient Optimization Method | Optional mask to lead to optimal interference over wavelength at the target |

Fig. 12

NON-COOPERATIVE LASER TARGET ENHANCEMENT SYSTEM AND METHOD

CROSS REFERENCE APPLICATIONS

This application is a non-provisional application claiming the benefits of provisional application No. 60/973,622 filed Sep. 19, 2007.

FIELD OF INVENTION

The present invention relates to a method and several system implementations for projection of laser beams through a turbulent medium with a non-cooperative target using a combination of an adaptive optical system and an ultra-short temporal coherence length laser source to form a controllable focused laser beacon at the target. A non-cooperative target refers to a target in which no laser beacon is provided directly by the target for wavefront sensing. The present invention provides a system and method to form a near diffraction limited size beacon for an adaptive optical system using a temporally partially coherent laser source.

BACKGROUND OF THE INVENTION

Adaptive optical system technology has proven itself invaluable to a number of applications such as astronomical imaging and long range optical communication through the atmosphere. Adaptive optical system technology can potentially enhance any application in which turbulence along the path, which leads to refractive index fluctuations due to temperature variations, degrades the performance of an imaging or laser projection system. Methods are well known in the prior art for dealing with great distances and associated phenomena of strong scintillation (wherein branch points in the phase function begin to dominate performance and amplitude fluctuations can begin to degrade performance). These methods have an important limitation that has remained unsolved throughout the history of the field: the only highly successful applications of adaptive optical systems to date are when a "cooperative" point source laser beacon at the target is provided. The point source beacon projected from the target is used to make wavefront sensing measurements of the distortions along the path for pre-compensation of a laser beam by the adaptive optical system. Many potential applications of adaptive optical systems, including laser radar, laser rangefinding, directed energy, and ophthalmic imaging all have "non-cooperative" targets. In the non-cooperative target case, no laser beacon is available from the target except that obtained from back-scattered radiation from the target itself or from the atmosphere (laser guide star obtained from Rayleigh or Mie light scattering). Many fundamental challenges exist in the case of a non-cooperative target. Overcoming these challenges would have significant benefit for many applications and open up the enabling capability for adaptive optical systems to new regimes and applications.

There is no prior art directly addressing the problem of adaptive optical systems with a non-cooperative target. There is significant prior art associated with the problem of both weak and challenging turbulence scenarios with a cooperative point source beacon. Particular recent examples include U.S. Pat. Application No. 20070176077, "System and method for correction of turbulence effects on laser or other transmission" and U.S. Pat. No. 7,113,268, "Scintillation tolerant optical field sensing system and associated method". The former describes in detail a control algorithm for a state of the art adaptive optical system that provides optimal performance over all turbulence conditions. The latter describes an alternate means to perform wavefront sensing and correction.

The only prior art potentially addressing the topic of adaptive optical systems with a non-cooperative target is in the field of opthalmic imaging. U.S. Pat. No. 6,648,473, "High-resolution retina imaging and eye aberration diagnostics using stochastic parallel perturbation gradient descent optimization adaptive optics". In this patent, the authors describe an imaging metric optimization based approach for correction of the effects of aberrations in the human eye. This non invasive technique offers safety advantages in that it does not require reflected back-scattered laser radiation in the human eye.

A second example that is more closely related to the present invention is in the area of optical coherence tomography. D. Merino, C. Dainty, A. Bradu, and A. G. Podoleanu, "Adaptive optics enhanced simultaneous en-face optical coherence tomography and scanning laser opthalmoscopy," *Optics Express* 14(8):3345-3353 describes imaging using optical coherence tomography (a method of obtaining three-dimensional imagery of the human eye using ultra short coherence length laser light) with enhancement of the imagery obtained by using an adaptive optical system. This paper presents a method to provide improved transverse resolution by pre-compensating the ultra short coherence length laser light for aberrations in the eye. There are several critical points to be made regarding the technical approach used in this paper: (1) The wavefront sensing technique utilized was a Shack-Hartmann wavefront sensor, which works well for aberrations in the near field (i.e. near the correction plane)—these type of measurements are the integral over a subaperture of the intensity weighted gradient of the phase function of the reflected laser light; (2) For the human eye the strongest aberrations are in the near field (near the correction plane) and the approach described in this paper is expected to have good performance; and (3) because the path length difference between the reference arm and the measurement arm of the interferometer can be controlled, in the field of optical coherence tomography the interferometer can use a metrological approach and a self-referencing capability is not required.

It is known that in more demanding propagation scenarios where the aberrations are distributed along the propagation path, more advanced wavefront sensing techniques that measure the complex field directly (rather than inferred measurements of the complex field such as that obtained using a Shack-Hartmann wavefront sensor) are required. It is also known that in such scenarios the performance of conventional target return and laser guide star return based adaptive optical systems suffer significant performance degradations.

What is needed is a method for forming a near diffraction limited size beacon at a non-cooperative target. The present invention provides a solution by providing a wavefront sensing and control technique to measure the aberrations along the propagation path using return from a short coherence length laser.

SUMMARY OF THE INVENTION

The primary aspect of the present invention is to provide an adaptive optical system and an ultra-short temporal coherence length laser source to form a controllable focused laser beacon at a non-cooperative target.

Another aspect of the present invention is the inclusion of a means to directly or indirectly maximize a sum or weighted sum of laser complex fields over the wavelength band in a coherent fashion.

Another aspect of the present invention is to provide for a plurality of transmission geometries.

Yet another aspect of the present invention is to allow for the formation of a narrow size region of coherent laser light at a target.

Another aspect of the present invention is to provide for a plurality of new applications including but not limited to biometrics, retinal and iris recognition and examination, finger print recognition, laser induced breakdown spectroscopy, security and terrorist control, etc.

Yet another aspect of the present invention is to provide for use of a plurality of transmission geometric patterns or masks in its applications.

Other aspects of this invention will appear from the following description and appended claims, reference being made to the accompanying drawings forming a part of this specification wherein like reference characters designate corresponding parts in the several views.

The present invention describes a method, denoted Broadband Coherent Adaptive Optics (BCAO), and a preferred embodiment to implement the method for forming a near diffraction limited size beacon at a non-cooperative target. The method combines adaptive optical system technology using any wavefront sensing technique that performs a sum or weighted sum of laser complex field measurements with an ultra short coherence length and associated broad spectral bandwidth (on the order of ½ to 1 times the laser wavelength). When used in particular potential transmission geometries, the partially coherent laser source only forms a narrow (near diffraction limited) size region of coherent laser light at the target—destructive interference across the spectral bandpass leads to incoherent light outside the small region. The coherent region of the return dominates the signal for any measurement technique that generates a complex field measurement. The signal can then be used to precompensate either the partially coherent laser beam, a long coherence length beam of a different wavelength or a wavelength in the bandpass (denoted the "scoring" beam), or both of the beams. In some propagation scenarios, the pre-compensation of the partially coherent laser beam leads to signal to noise ratio enhancements as more energy is concentrated in the narrow coherent region at the target.

BRIEF DESCRIPTION OF THE DRAWINGS

FIG. 5($b$) is a more detailed schematic of the Broadband Coherent Adaptive Optical (BCAO) system of the present invention configured for image compensation.

FIG. 8($a$) is a schematic of an example of a filter used to obtain fringe patterns for measurement by the wavefront sensor.

FIG. 8($b$) is a schematic illustrating the two laser beams on the detector array.

FIG. 9($a$) is a schematic of one mask or beam re-shaping pattern option for the partially coherent beacon laser.

FIG. 9($b$) is a schematic of one mask or beam re-shaping option for the partially coherent beacon laser.

FIG. 9($c$) is a schematic of one mask or beam re-shaping option for the partially coherent beacon laser using four small projected beams.

FIG. 12 is a table summarizing various embodiments of the invention.

Figures 1, 2, 3:
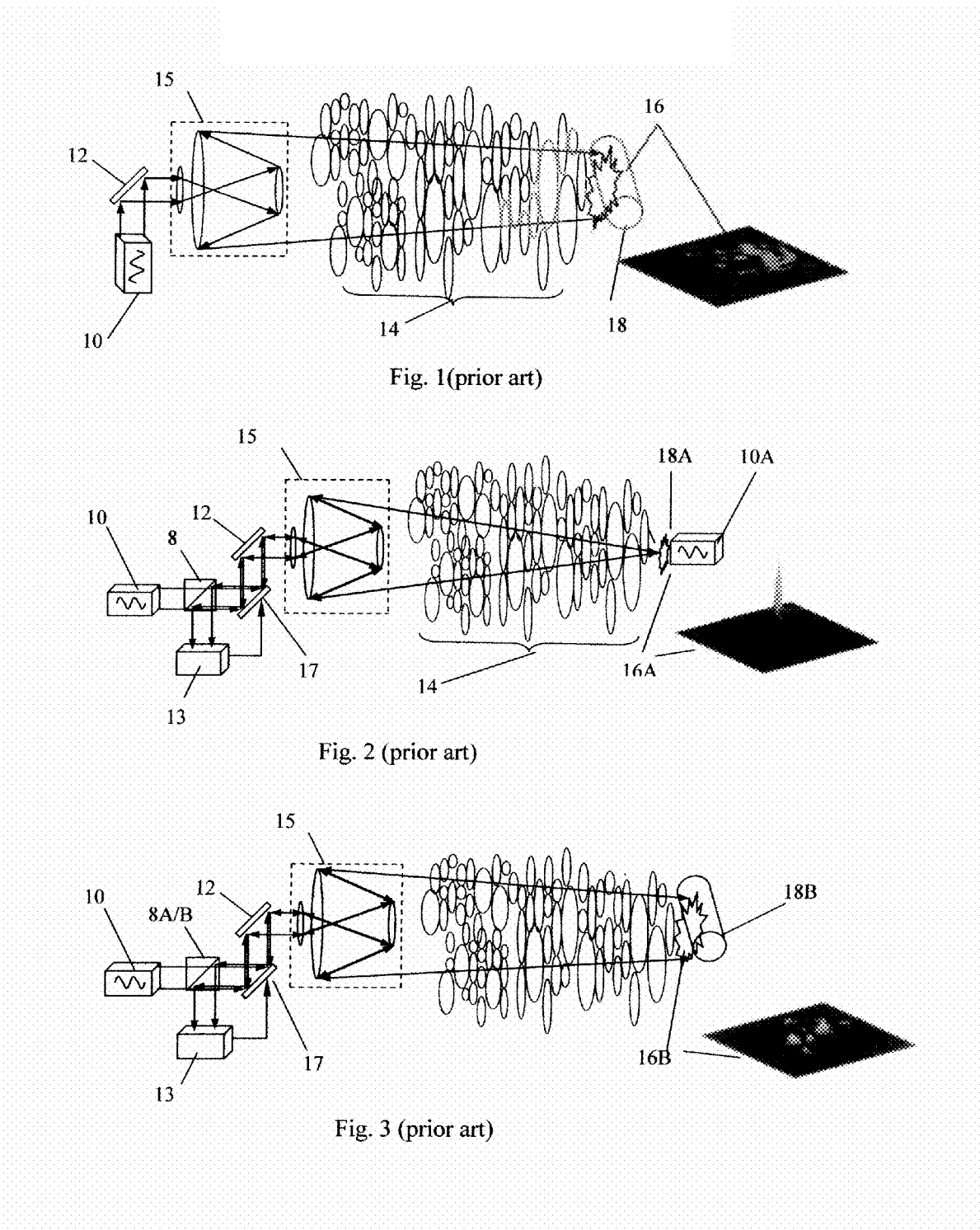
FIG. 1 (prior art) is a schematic showing the impact of turbulence on a laser beam projected through the atmosphere.
FIG. 2 (prior art) is a schematic of an Adaptive Optical system with a cooperative point source beacon.
FIG. 3 (prior art) is a schematic of an Adaptive Optical system with a non-cooperative target.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

The present invention describes a method, denoted Broadband Coherent Adaptive Optics (BCAO), and preferred embodiment to implement the method for forming a near diffraction limited size beacon at a non-cooperative target. The critical elements of the BCAO system are shown in FIGS. 5$a$, 5$b$ and 6.

The BCAO system of the present invention comprises:

(1) A partially coherent laser—defined as a carrier envelope phase stabilized laser with a temporal coherence length, $l_c=\lambda^2/\Delta\lambda$, less than $10N_e\lambda_5$, where $N_e$ is the effective number of control channels across the aperture [$N_e=(N_{tot}\pi)^{1/2}$, where $N_{tot}$ is the total number of controlled modes or control channels], $\lambda$ is the center wavelength, and $\Delta\lambda$ is the spectral bandwidth of the laser source—that is either pre-compensated (ref. FIGS. 5$a$, 5$b$—where FIG. 5$a$ indicates additional pre-compensation of one or more scoring laser beams to the target and FIG. 5$b$ indicates compensation only for imaging) or not pre-compensated (FIGS. 6$a$, 6$b$—where the FIG. 6$a$ indicates additional pre-compensation of one or more scoring laser beams to the target and FIG. 6$b$ indicates compensation only for imaging);

(2) A means to transfer the partially coherent laser beam through the optical system and transmit the beam to a target;

(3) A means to accomplish beam steering—illustrated below in FIGS. 5$a$, 5$b$, 6$a$, and 6$b$ is a steering mirror, but many other methods exist that are known to those skilled in the art including but not restricted to liquid crystal steering devices, Risley prisms, and controllable diffraction gratings.

(4) A means to accomplish beam correction steering—illustrated in FIGS. 5$a$, 5$b$, 6$a$, and 6$b$ is a continuous facesheet deformable mirror or continuous facesheet membrane deformable mirror (either of which comprises the preferred embodiment), but any phase correction device is applicable as well including but not limited to segmented deformable mirrors with either piston or piston+tip+tilt segments, liquid crystal deformable mirrors, and micro-electro-mechanical system (MEMS) deformable mirrors;

(5) A means of wavefront sensing and control that directly or indirectly maximizes the sum or weighted sum of laser complex fields over wavelength to measure the return wavefront and determines the control commands to apply to the phase correction device;

(6) A means to determine the appropriate command to be applied to the steering device—which for those skilled in the art is known to include tracking systems that measure the signal from the target—either from active illumination of the target or from passive illumination of the target, tracking systems that measure the return of the partially coherent laser beam from the target, or an aimpoint control and maintenance system that uses an independent sensor to measures the position of the outgoing laser beam (whether a scoring beam or the partially coherent laser beam) relative to the desired aimpoint on the target, or some combination of any of these techniques; and (7) An optional mask or beam re-shaping optics and/or arrangement of the transmitted pattern of the partially coherent laser beam to provide a desired mean complex field amplitude (averaged over the wavelength band)—where the term "desired" can vary based on the application but generally means the smallest possible beam at the target plane. Examples are given in FIGS. 9a, 9b, and 9c.

Figure 7:
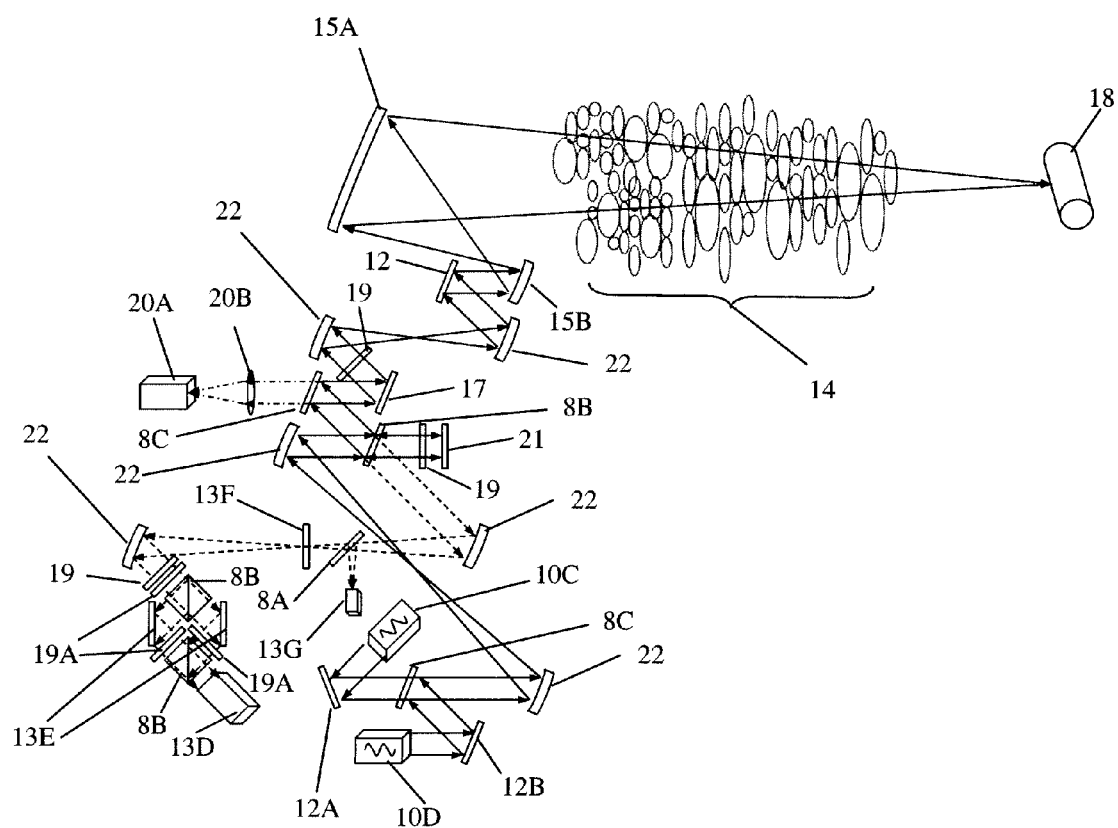
FIG. 7 is a schematic of the preferred embodiment for the Broadband Coherent Adaptive Optical (BCAO) system of the present invention configured for pre-compensation of a scoring laser beam.

The preferred embodiment for the present invention is illustrated further in FIGS. 7, 8a, and 8b.

Additional detail is provided for each of the above main elements of the present invention:

(1) The partially coherent laser source is any carrier envelope phase stabilized laser source, pulsed or continuous wave with a spectral bandwidth such that the temporal coherence length, $l_c = \lambda^2/\Delta\lambda$, is less than $10N_e\lambda$, where $N_e$ is the effective number of control channels across the aperture [$N_e = (N_{tot}/\pi)^{1/2}$, where $N_{tot}$ is the total number of controlled modes or control channels], $\lambda$ is the center wavelength, and $\Delta\lambda$ is the spectral bandwidth of the laser source. The number $N_{tot}$ refers to the number of control modes or control channels of the phase correction device described herein. A typical preferred embodiment for the partially coherent laser source would be a laser source such that $l_c$ is as small as possible but not so small that $\Delta\lambda/\lambda$ is large enough to lead to sensing errors associated with chromatic anisoplanatism (the wavefront error induced due to sensing at wavelengths not matching the scoring wavelength). The preferred embodiment has $\Delta\lambda/\lambda$ of approximately 0.35 to 0.5, but this must be optimized for the application of interest. Depending on the application of interest, any of the configurations shown in FIGS. 5a, 5b, 6a, and 6b may be appropriate—the present invention encompasses all of these methods.

(2) The means to transfer the partially coherent laser is any combination of optics that transfers the partially coherent laser from the source to the aperture. The preferred embodiment is to re-image the beam from the source plane where the beam is at best collimation to the transmit aperture for focusing to the target. The preferred embodiment is that the beam transfer optics be achromatic, which is ideally achieved via purely reflective optics but can be achieved using achromatic lens relays.

(3) The means to accomplish beam pointing is arbitrary, and many methods are known to those skilled in the art including but not restricted to a steering mirror, liquid crystal steering devices, Risley prisms, and controllable diffraction gratings. The preferred embodiment is noted to have the capability (by inclusion of two steering devices) to point the transmit beam in a different direction from the received beam if this is determined to be necessary.

(4) The means to accomplish beam phase correction is arbitrary and many methods are known to those skilled in the art including but not limited to continuous facesheet deformable mirrors, segmented deformable mirrors with either piston or piston+tip+tilt segments, liquid crystal deformable mirrors, membrane deformable mirrors, and micro-electro-mechanical system (MEMS) deformable mirrors. The preferred embodiment is to use a continuous facesheet deformable mirror using either conventional piezo actuator technology or membrane deformable mirror technology. The reason for the continuous facesheet deformable mirror is to minimize the wavefront fitting error (difference between the approximation of the wavefront induced by the response of the correction device and the actual wavefront) across the spectral band of wavelengths to be corrected.

(5) Inclusion of a means to directly or indirectly maximize the sum or weighted sum of laser complex fields over the wavelengths. The coherent averaging or weighted averaging over wavelength makes the return from the target appear as a source with a narrow region of coherence, with diameter roughly $l_c L/D$ where L is the range to the target and D is the aperture diameter (refer to the discussion of the optional optimal mask in item 7 below to see a discussion on methods to minimize the region of coherence). There is a broad range of options for the complex field measurement—under the assumption that the field measurement can be made accurately while averaging or weighted averaging over the broad spectral bandwidth. The methods listed below are well known to those skilled in the art. These methods are all suitable for use with any of three control methods described below as all can be used to generate a sum or weighted sum of the complex field over wavelength, over some spatial extent.

a. Autodyne interferometry: In this method a sample of the transmitted beam is interfered with the return beam. It is expected that this method will be highly impractical because the distance to the target is nominally assumed to be large, but with a precision rangefinder it is theoretically possible to implement this method. Laser speckle may cause a degradation in use of this method. This method can be used to produce only fringes or in a phase shifting interferometry methodology (spatial phase shifting to minimize vibration sensitivity or temporal phase shifting).

b. Heterodyne interferometry: In this method a narrow line width beam is interfered with the return beam and the difference frequency, with the phase information encoded in the signal, is measured with a high rate detector. This method will be difficult to implement over a broad bandwidth but in theory can be implemented to provide an average of the complex field over wavelength, over some spatial wavelength. This method can be used to produce only fringes or in a phase shifting interferometry methodology (spatial phase shifting to minimize vibration sensitivity or temporal phase shifting).

c. Self-referencing interferometry: In this method, a sample of the return beam is spatially filtered to form a DC reference and interfered with the return beam to measure the return beam. This method can be used simple to produce fringes or in a phase shifting interferometry methodology (spatial phase shifting to minimize vibration sensitivity or temporal phase shifting).

Any interferometric technique that enables one to compute the average or weighted average over wavelength, over some spatial extent is suitable. The preferred embodiment is included by illustration in FIGS. 7, 8a, and 8b. This embodiment has the advantage of being suitable for use with a broad spectral bandwidth as it can be implemented with achromatic components. This embodiment can only be used with the gradient optimization control scheme detailed below. The other control techniques inherently require a phase shifting interferometry methodology because they require knowledge of the phase (computed from the average of the complex field over the wavelength). The control techniques that follow are characterized as example implementations of the general purpose embodiment of the BCAO system of the present invention illustrated by the flow chart in FIG. 10.

In the case that a phase shifting interferometer is used, or a computation technique that produces phase over the unit circle is used, then any control algorithm that takes the phase measurement and produces a deformable mirror command can be used. Three examples of control algorithms that are suitable for use when phase is known around the entire unit circle include:

a. The Exponential Filter Control Algorithm for use with interferometer data which is comprised of the following steps:
  i. Given a plurality of complex field measurements, $U(n,m)$, that are reduced to measurements having a one to one mapping to phase correction device control channels and described by two dimensional grid coordinates n and m, compute the arc-tangent with a quadrant check to obtain phase, $\phi(n,m)=\text{a tan } 2[\text{Im } U(n,m), \text{Re } U(n,m)]$.
  ii. Update the phase correction device commands at time k according to the filter, $c_k=\text{mod }[(1-a)c_{k-1}+aK_{DC}\phi+\pi, 2\pi]-\pi$, where $K_{DC}$ is typically in the range from 5 to 30 and is the DC loop gain and a is typically in the range from 0.0001 to 0.1 and is used to control the roll-off frequency of the control loop.
  iii. Define G as the matrix defining the shearing-geometry (also known as the Hutchin-geometry) phase difference measurements.
  iv. Unwrap the phase correction device commands, $c_k=\text{LS}[c_k]+\text{mod }[c_k-\text{LS}[c_k], 2\pi]-\pi$, where $\text{LS}[c_k]=(G^TG)^{-1}G^T[\text{mod}(Gc_k+\pi, 2\pi)-\pi]$.
  v. Apply gain and offset correction to the phase correction device commands according to standard practice and apply the commands to the phase correction device.

b. The Linear Filter Control Algorithm for use with interferometer data.
  i. Given a plurality of complex field measurements, $U(n,m)$, that are reduced to measurements having a two by two to one mapping to phase correction device control channels and described by two dimensional grid coordinates n and m, compute the arc-tangent with a quadrant check to obtain phase, $\phi(n,m)=\text{a tan } 2[\text{Im } U(n,m), \text{Re } U(n,m)]$.
  ii. Define G as the matrix defining the shearing-geometry (also known as the Hutchin-geometry) phase difference measurements.
  iii. Unwrap the phase measurement data, $\phi=\text{LS}[\phi]$, where $\text{LS}[\phi]=(G^TG)^{-1}G^T[\text{mod}(G\phi+\pi, 2\pi)-\pi]$. Compute actuator resolution phase data, $\phi_{LR}$, via an appropriate interpolation or averaging scheme to map from phase measurement coordinates to control channel coordinates.
  iv. Update the phase correction device commands at time k according to the filter, $c_k=(1-a)c_{k-1}+aK_{DC}\phi_{LR}$, where $K_{DC}$ is typically in the range from 5 to 30 and is the DC loop gain and a is typically in the range from 0.0001 to 0.1 and is used to control the roll-off frequency of the control loop.
  v. Apply gain and offset correction to the phase correction device commands according to standard practice and apply the commands to the phase correction device.

c. The Modal Direct Phase Control and Direct Phase Control algorithms (ref. Barchers, J. D. U.S. Pat. Application 20070176077).

A different class of closed loop control algorithms, gradient descent based algorithms, can be used if phase is not known exactly and only fringe data is available. Although gradient descent based algorithms are also suitable for use in situations where the phase is known over the entire unit circle, the greatest advantages for gradient descent based algorithms are obtained when one takes advantage of the gradient descent formalism to reduce the complexity of the optical configuration and obtain only fringe data. Gradient descent based algorithms include a broad class of algorithms, including, but not limited to: Stochastic Parallel Gradient Descent (SPGD) and Multi-Dither. These methods are all well documented in the open literature and all follow the same general principle: form a metric, perturb the phase correction device to measure the gradient of the metric with respect to the phase correction device command, and follow the gradient to maximize (or minimize) the metric. In the case of the present invention, the ideal metric to be maximized is:

$$J = \left| \int_{\lambda_{min}}^{\lambda_{max}} d\lambda \int_{Aperture} d\vec{r} U(\vec{r}, \lambda) \right|^2$$

This metric is interesting because it includes interference across wavelengths. Utilizing a phase shifting interferometer produces phase commands for a phase correction device that maximize this metric. This metric is practically difficult to compute directly, however, maximization of other metrics such as receive on-axis power in a diffraction limited size bucket focused at an equivalent distance, f, $$J_{PIB} = \int_{\lambda_{min}}^{\lambda_{max}} d\lambda \left| \int_{Bucket} d\vec{r}' \int_{Aperture} d\vec{r} U(\vec{r}, \lambda) \exp\left(-i\frac{2\pi}{\lambda f} \vec{r} \cdot \vec{r}'\right) \right|^2$$

or maximization of the fringe intensity on an interferometer (averaged over some spatial extent for a region k), $$J_k = \int_{\lambda_{min}}^{\lambda_{max}} d\lambda \int_{Domain_k} d\bar{r} \left| \sqrt{1-\eta}\, U(\bar{r},\lambda) + \sqrt{\eta}\, U_{ref}(\bar{r},\lambda)\exp(i\pi/2) \right|^2 -$$

$$\int_{\lambda_{min}}^{\lambda_{max}} d\lambda \int_{Domain_k} d\bar{r} \left| \sqrt{1-\eta}\, U(\bar{r},\lambda) + \sqrt{\eta}\, U_{ref}(\bar{r},\lambda)\exp(-i\pi/2) \right|^2$$

$$= \int_{\lambda_{min}}^{\lambda_{max}} d\lambda \int_{Domain_k} d\bar{r} \sqrt{\eta}\, \sqrt{1-\eta}\, |U(\bar{r},\lambda)||U_{ref}(\bar{r},\lambda)|$$

$$\sin[\arg U(\bar{r},\lambda) U_{ref}^*(\bar{r},\lambda)]$$

$$U_{ref}(\bar{r},\lambda) =$$

$$\frac{1}{(\lambda f)^4} \int_{Bucket} d\bar{r}' \exp\left(-i\frac{2\pi}{\lambda f}\bar{r}\cdot\bar{r}'\right) \int_{Aperture} d\bar{r} U(\bar{r},\lambda)\exp\left(-i\frac{2\pi}{\lambda f}\bar{r}\cdot\bar{r}'\right)$$

will also maximize this metric.

The basis of gradient descent based methods is to measure the derivative of the metric with respect to some actuator command (be it a modal command including the motion of many channels or a single channel), $\partial J/\partial c_n$, and then update the control commands according to, For Multi-Dither:

$$c_n = c_{n-1} - \alpha \frac{\partial J}{\partial c_n}$$

For SPGD:

$$c_n = c_{n-1} - 2\alpha[J(c_n + \delta c_n) - J(c_n - \delta c_n)]\delta c_n$$

The method of SPGD ostensibly can exhibit faster convergence rates due to decoupling of the control commands if a random combination of the control modes are simultaneously applied. For the metric, $J_k$, it is assumed that a plurality of measurements are made with different regions, $Domain_k$, each with a different set of one or more control commands that directly impact the region, $Domain_k$. This technique was applied by Vorontsov, et. al., to provide a de-coupling of the control channels in an SPGD-based adaptive optical system, leading to improved convergence rates. Regardless of the technique chosen, any gradient descent based method that leads directly or indirectly to optimization of the metric, J, will provide a sufficient control system for the present invention.

Figure 11:
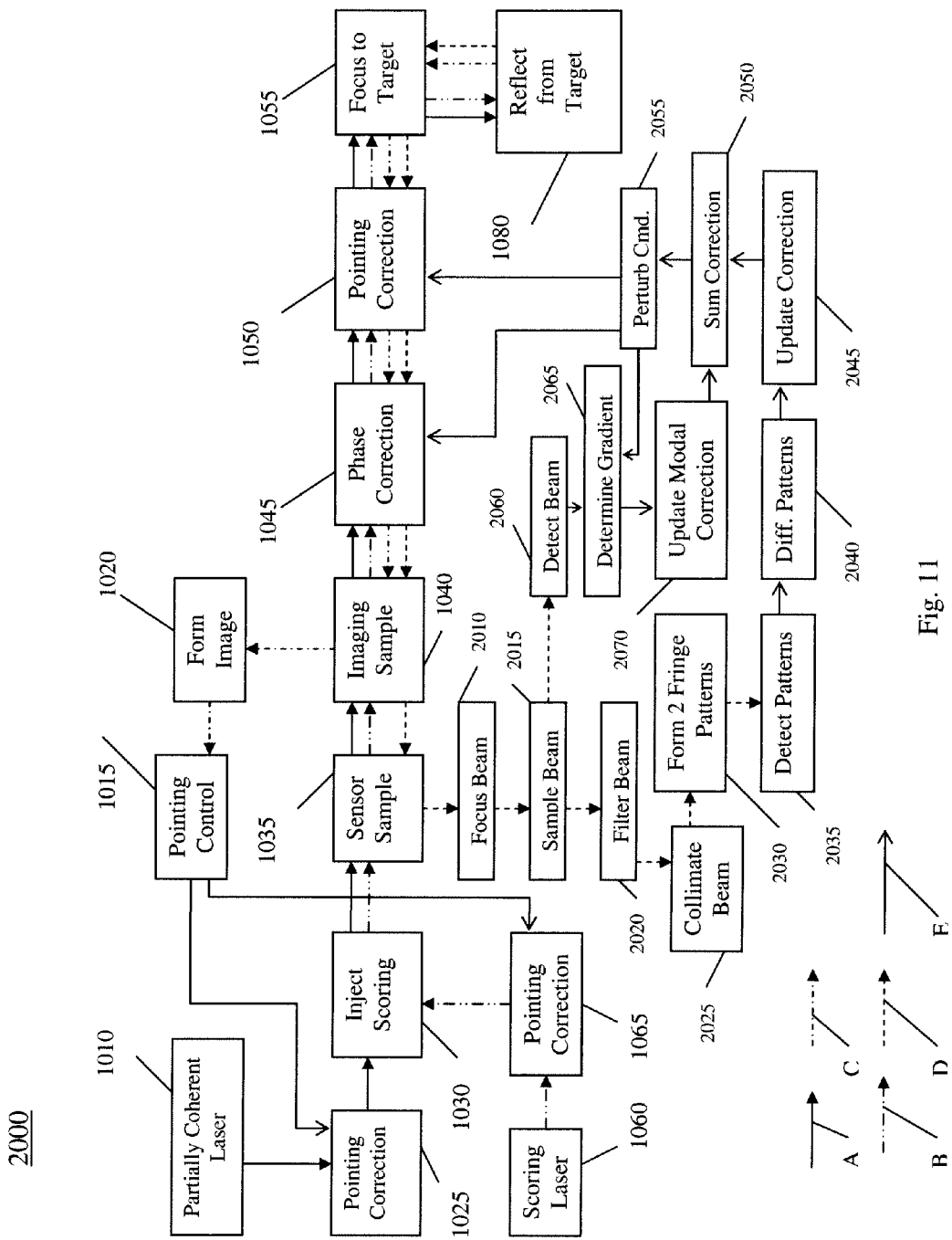
FIG. 11 is a flow chart of the preferred embodiment of the BCAO system of the present invention.

The preferred embodiment of the BCAO system of the present invention is described by illustration in FIGS. 7, 8(*a*), 8(*b*) and by the flow chart in FIG. 11. The preferred embodiment utilizes achromatic components in the optical system to obtain the required measurements. The measurement technique combines two aspects of the gradient optimization technique and is a slight variation of the de-coupled SPGD technique described in the open literature by Vorontsov, et. al. rates. The preferred embodiment is to use the multi-dither, rather than SPGD technique. A modal basis set of $N_{modal}$ actuator commands, defined by Zernike patterns $2-N_{modal}$ (tip and tilt are included in the modal basis) are adjusted and controlled via either multi-dither or SPGD as described above using the $J_{PIB}$ metric defined above and measured as described in FIGS. 7 and 11. This control loop is denoted the modal control loop and if the bandwidth capability of the model control loop is sufficient (with a single control channel the bandwidth of the modal control loop is approximately no better than $10N_{modal}$ times slower than the detector sample rate.

If a higher bandwidth is required, then a plurality of measurements, $J_k$, are made with each measurement corresponding to a single control channel on the phase correction device. The measurements $J_k$ are made as illustrated in FIG. 7 via an interferometer that, if properly designed with standard considerations well known to those skilled in the art, can be implemented with white light and hence is suitable for use with the partially coherent beacon laser choices of the present invention. This interferometer is a Differential Zernike Filter—a standard technique well known in the field for decades. Each measurement signal $J_k$ produces a gradient signal that is used to update the actuator commands directly via gradient descent. This high bandwidth control loop, denoted the Higher Order Control Loop acts as the "tweeter" control loop whereas the Modal Control Loop as the "woofer". Stability is preserved by ensuring that the Modal Control Loop has a control bandwidth roughly 4 or more times lower than the Higher Order Control Loop.

(6) The means to determine the appropriate command to be applied to the steering device is considered to be a standard procedure for those skilled in the art. The methods that are known include tracking systems that measure the signal from the target—either from active illumination of the target or from passive illumination of the target, tracking systems that measure the return of the partially coherent laser beam from the target, or an aimpoint control and maintenance system that uses an independent sensor to measures the position of the outgoing laser beam (whether a scoring beam or the partially coherent laser beam) relative to the desired aimpoint on the target, or some combination of any of these techniques. The requirement for a tracking system for the present invention is simply to ensure the aimpoint is maintained in the desired location. If there is no need to maintain the aimpoint, then no tracking system is required other than to provide coarse pointing.

(7) The optional mask is suggested as a means to maximize the de-correlation of the beam at the target plane. 3 patterns have been considered that are illustrated in FIG. 9: (a) full aperture disc; (b) an annular disc; and (c) a 2×2 pattern of disc beams where the separation between the beams determines the region of coherence. The annular disc or the 2×2 pattern are expected to provide the best performance for most applications. The full aperture disc beam will have a larger average region of coherence at the target and will in some conditions exhibit reduced performance.

The present invention provides for the ability to open up and/or greatly improve many new applications due to its short coherence length. Some examples of such applications are given by way of example and not of limitation including:

Biometrics and Remote Biometrics including areas such as;
  Iris recognition;
  Retinal recognition;
  Three dimensional finger print recognition;
Medical applications such as;
  Optical examination and/or surgery;
  Heart examination and/or surgery;
  Internal organ examination and/or surgery etc.

Terrorist control including:
  Mine, improvised explosive device, and Roadside bomb detection and/or destruction;
  Airport recognition (retinal, iris, etc.)
  Laser Induced Breakdown Spectroscopy;
  Air particulate recognition;
    Chemical recognition;
    Biological sabotage control;
    Emission quality control;

DETAILED DESCRIPTION OF THE DRAWINGS

FIG. 1 (prior art) is a schematic illustrating the impact of turbulence on a laser beam projected through the atmosphere. Laser 10 forms a signal that passes through the pointing mirror 12, and telescope 15 focuses the beam at the target 18. Random atmospheric turbulence 14 leads to temperature variations along the path to the target 18, which in turn, leads to refractive index variations causing a dispersed signal 16 which results in break-up at target 18.

FIG. 2 (prior art) is a schematic of an Adaptive Optical system with a cooperative point source beacon. A "cooperative" point source laser beacon at the target 18A is provided via laser 10A. Beam Splitter 8, which can be an intensity beam splitter, dichroic beam splitter, or polarizing beam splitter (which must be used in conjunction with a quarter wave plate, not shown), is used to direct a sample of the beacon beam to the wavefront sensor and controller 13. Wavefront sensor and controller 13 measures the aberrations along the propagation path 14, developing control commands for the deformable mirror 17 and the steering mirror 12 to pre-correct the effects of random turbulence, leading to a focused beam 16A at the target 18A. The point source beacon projected from the target laser 10A is used to make wavefront sensing measurements of the distortions along the path for pre-compensation of a laser beam by the adaptive optical system.

FIG. 3 (prior art) is a schematic of an Adaptive Optical system with a non-cooperative target. Laser 10 is pre-corrected by the deformable mirror 17 and steering mirror 12 and focused to the target by the telescope 15. Beam Splitter 8A/B, which can be an intensity beam splitter or polarizing beam splitter (which must be used in conjunction with a quarter wave plate, not shown), is used to direct a sample of the beam to the wavefront sensor and controller 13. Wavefront sensor 13 measures the aberrations along the propagation path 14, developing control commands for the deformable mirror 17 and the steering mirror 12 to pre-correct for the effects of turbulence along the path 14, however, because target 18C is non-cooperative only a small improvement in performance is observed at target signal 16B.

Figure 4:
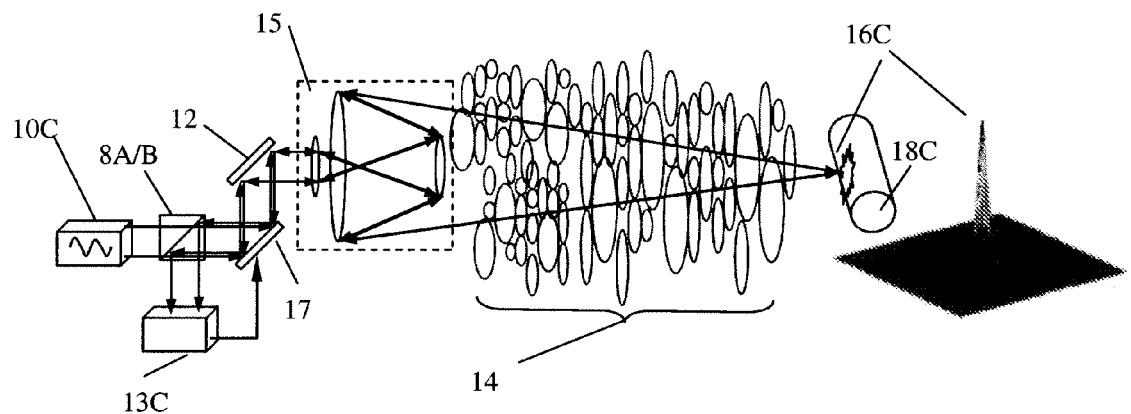
FIG. 4 is a schematic of the Broadband Coherent Adaptive Optical (BCAO) system of the present invention.

FIG. 4 is a top level schematic of the Broadband Coherent Adaptive Optical (BCAO) system of the present invention. The short coherent length laser 10C (which can be configured with an optional mask or beam re-shaping optics at the output to minimize correlation size at the target) is pre-corrected by the deformable mirror 17 and the steering mirror 12 and focused to the target by the telescope 15. The return from the target is directed to the wavefront sensor and controller 13C by means of the beam splitter 8A/B, which can be an intensity beam splitter or polarizing beam splitter (which must be used in conjunction with a quarter wave plate, not shown). Wavefront sensor 13C measures the aberrations along the propagation path 14 using return from the short coherence length (broad spectral band) laser 10C, developing control commands for the deformable mirror 17 to pre-correct the effects of turbulence 14. The short coherence length of laser 10C leads to a small coherent region at non-cooperative target 18C, providing a near diffraction limited size beacon signal 16C resulting in good performance.

Figure 5A:
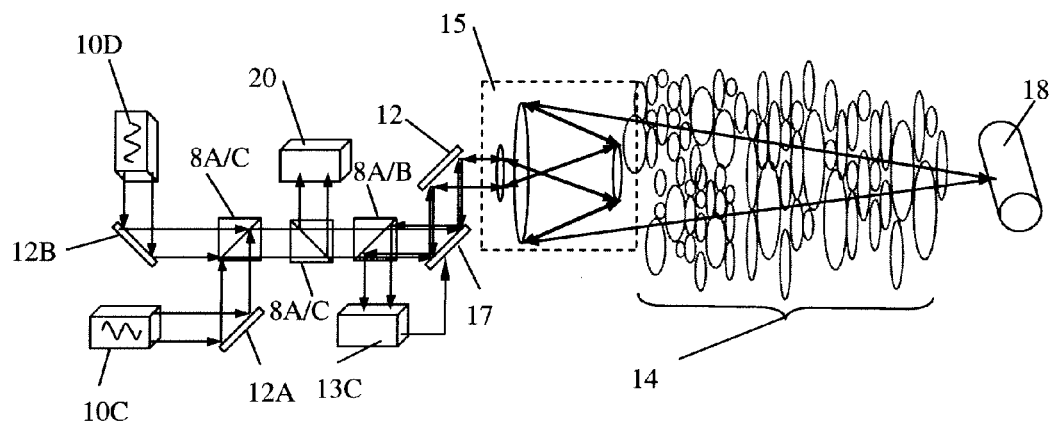
FIG. 5($a$) is a more detailed schematic of the Broadband Coherent Adaptive Optical (BCAO) system of the present invention configured for pre-compensation of a laser beam.

FIG. 5(a) is a more detailed embodiment of the BCAO system of the present invention, with the configuration shown for pre-correction of a "scoring" laser beam 10D for propagation through turbulence along the path 14. The term "scoring" laser beam applies to any beam that is desired to be propagated through turbulence to a target. The partially coherent laser beacon beam 10C (which can be configured with an optional mask or beam re-shaping optics at the output to minimize correlation size at the target) is directed to the propagation path by the beam splitter 8A/C (which can be either an intensity or chromatic beamsplitter) pre-corrected by the deformable mirror 17 and the steering mirrors 12 and 12A, and focused by the telescope 15 through the turbulent medium 14 to the target 18. The return from the partially coherent laser beacon beam 10 is directed to the wavefront sensor and controller 13 by the beam splitter 8A/B (which can be either an intensity or polarizing beam splitter—the latter of which must be used in conjunction with a quarter wave plate—not shown). The wavefront sensor and controller 13 controls the deformable mirror 17 and in most embodiments controls the steering mirror 12. In most embodiments a sample of return light in some wavelength band is directed by the beam splitter 8A/C (which can be either an intensity or chromatic beam splitter) to the imaging/tracking sensor 20 to determine pointing commands for the partially coherent laser 10 and scoring laser 10D and is used to control the steering mirrors 12A and 12B. Any of the steering mirrors could instead be controlled by either the wavefront sensor and controller 13, or by the imaging/tracking sensor 20. The scoring laser is pre-corrected by the deformable mirror 17 and steering mirrors 12 and 12B for focusing by the telescope and propagation to the target 18 through the turbulent path 14.

Figure 5B:
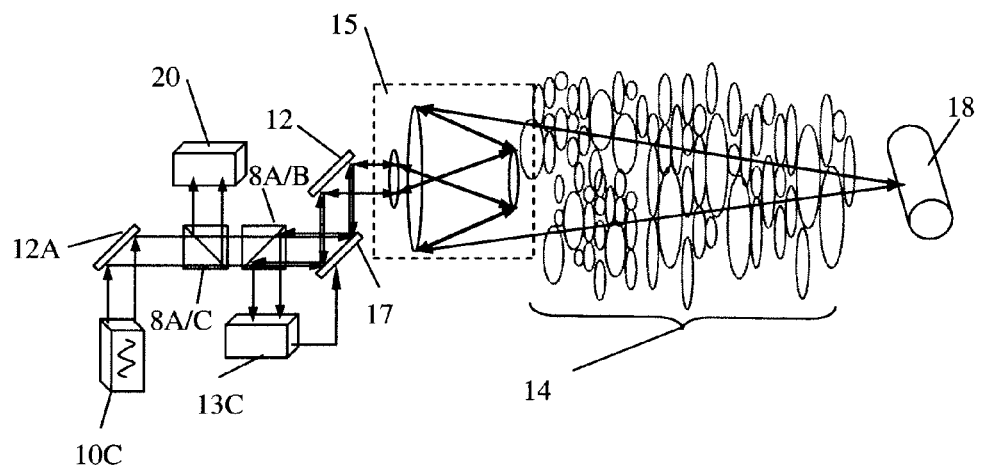

FIG. 5(b) is a more detailed embodiment of the BCAO system of the present invention, with the configuration shown for correction for an imaging scenario. The partially coherent laser beacon beam 10C (which can be configured with an optional mask or beam re-shaping optics at the output to minimize correlation size at the target) is pre-corrected by the deformable mirror 17 and the steering mirrors 12 and 12A, and focused by the telescope 15 through the turbulent medium 14 to the target 18. The return from the partially coherent laser beacon beam 10 is directed to the wavefront sensor and controller 13 by the beam splitter 8A/B (which can be either an intensity or polarizing beam splitter—the latter of which must be used in conjunction with a quarter wave plate—not shown). The wavefront sensor and controller 13 controls the deformable mirror 17 and in most embodiments controls the steering mirror 12. In most embodiments a sample of return light in some wavelength band is directed by the beam splitter 8A/C (which can be either an intensity or chromatic beams splitter) to the imaging/tracking sensor 20 to determine pointing commands for the partially coherent laser 10 which correspondingly corrects the receive imaging path, improving image quality in the imaging/tracking sensor 20, and is used to control the steering mirrors 12A and 12B. Any of the steering mirrors could instead be controlled by either the wavefront sensor and controller 13 or by the imaging/tracking sensor 20.

Figure 6A:
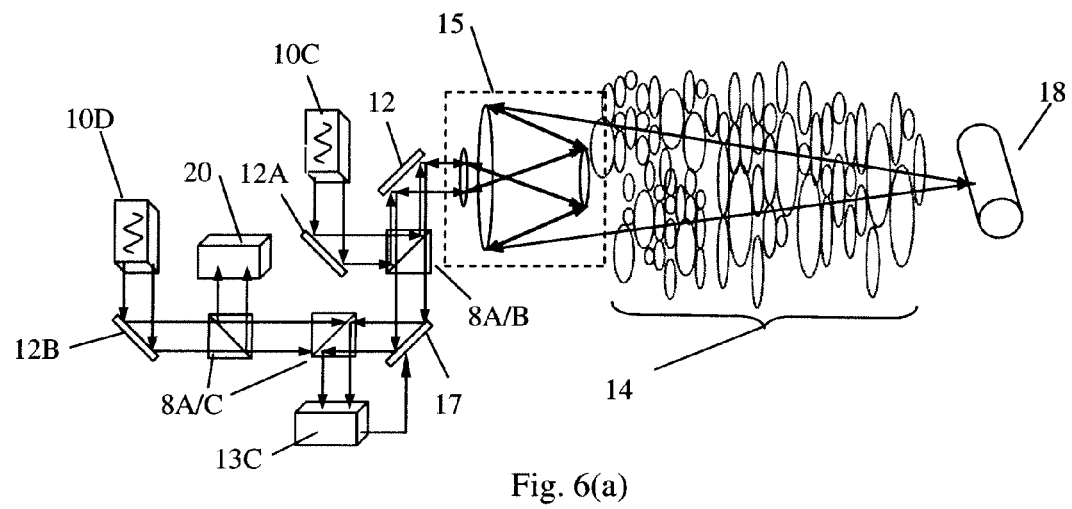
FIG. 6($a$) is a schematic of an alternate configuration for the Broadband Coherent Adaptive Optical (BCAO) system of the present invention configured for pre-compensation of a laser beam FIG. 6($b$) is a schematic of an additional alternate configuration for the Broadband Coherent Adaptive Optical (BCAO) system of the present invention configured for image compensation.

FIG. 6(a) is a schematic of an alternate configuration for the Broadband Coherent Adaptive Optical (BCAO) system of the present invention configured for pre-compensation of a laser beam. The partially coherent laser beam is not pre-compensated.

FIG. 6(a) is a more detailed embodiment of the BCAO system of the present invention, with the configuration shown for pre-correction of a "scoring" laser beam 10D for propagation through turbulence along the path 14. The term "scoring" laser beam applies to any beam that is desired to be propagated through turbulence to a target. The partially coherent laser beacon beam 10C (which can be configured with an optional mask or beam re-shaping optics at the output to minimize correlation size at the target) is directed to the propagation path by the beam splitter 8A/B (which can be either an intensity or polarizing beam splitter—the latter of which must be used in conjunction with a quarter wave plate—not shown) pre-corrected by the steering mirrors 12 and 12A, and focused by the telescope 15 through the turbulent medium 14 to the target 18. The return from the partially coherent laser beacon beam 10 is directed to the wavefront sensor and controller 13 by the beam splitter 8A/B (which can be either an intensity or polarizing beam splitter—the latter of which must be used in conjunction with a quarter wave plate—not shown). The wavefront sensor and controller 13 controls the deformable mirror 17 and in most embodiments controls the steering mirror 12. In most embodiments a sample of return light in some wavelength band is directed by the beam splitter 8A/C (which can be either an intensity or chromatic beam splitter) to the imaging/tracking sensor 20 to determine pointing commands for the partially coherent laser 10 and scoring laser 10D and is used to control the steering mirrors 12A and 12B. Any of the steering mirrors could instead be controlled by either the wavefront sensor and controller 13 or by the imaging/tracking sensor 20. The scoring laser is pre-corrected by the deformable mirror 17 and steering mirrors 12 and 12B for focusing by the telescope and propagation to the target 18 through the turbulent path 14.

Figure 6B:
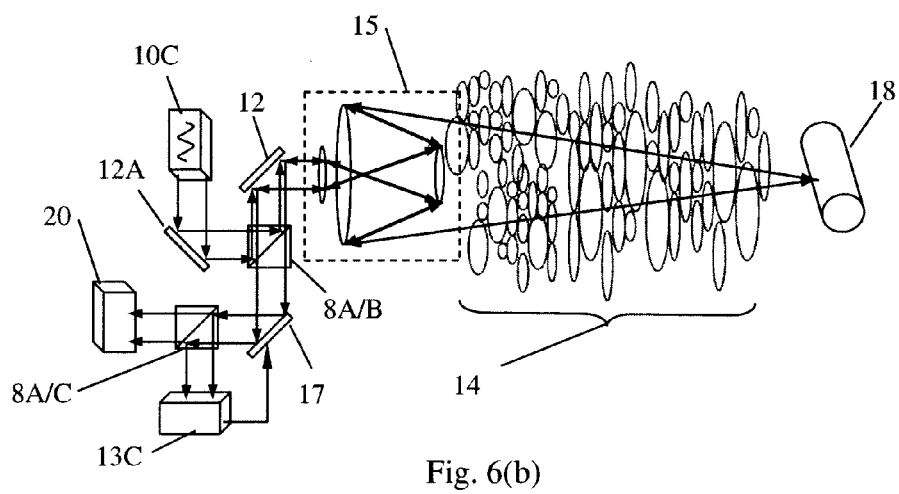

FIG. 6(b) is a schematic of an alternate configuration for the Broadband Coherent Adaptive Optical (BCAO) system of the present invention configured for image compensation. The partially coherent beacon laser is not pre-compensated. FIG. 6(b) is a more detailed embodiment of the BCAO system of the present invention, with the configuration shown for correction for an imaging scenario. The partially coherent laser beacon beam 10C (which can be configured with an optional mask or beam re-shaping optics at the output to minimize correlation size at the target) is directed to the propagation path by the beam splitter 8A/B (which can be either an intensity or polarizing beam splitter—the latter of which must be used in conjunction with a quarter wave plate—not shown) pre-corrected by the steering mirrors 12 and 12A, and focused by the telescope 15 through the turbulent medium 14 to the target 18. The return from the partially coherent laser beacon beam 10 is directed to the wavefront sensor and controller 13 by the beam splitter 8A/B (which can be either an intensity or polarizing beam splitter—the latter of which must be used in conjunction with a quarter wave plate—not shown). The wavefront sensor and controller 13 controls the deformable mirror 17 and in most embodiments controls the steering mirror 12. In most embodiments a sample of return light in some wavelength band is directed by the beam splitter 8A/C (which can be either an intensity or chromatic beam splitter) to the imaging/tracking sensor 20 to determine pointing commands for the partially coherent laser 10 which correspondingly corrects the receive imaging path, improving image quality in the imaging/tracking sensor 20, and is used to control the steering mirrors 12A and 12B. Any of the steering mirrors could instead be controlled by either the wavefront sensor and controller 13 or by the imaging/tracking sensor 20.

FIG. 7 is a schematic of the preferred embodiment for the Broadband Coherent Adaptive Optical (BCAO) system of the present invention configured for pre-compensation of a scoring laser beam. The location of the injection of the scoring beam is arbitrary and there are multiple locations for injection that are not shown. If the scoring beam is removed, then the same preferred embodiment can be used for compensated imaging. A pulsed partially coherent laser beam 10 is relayed into the optical path by the steering mirror 12A, chromatic filter 8C, and relay off-axis parabolic mirrors 22. The polarizing plate beam splitter 8B directs the majority of the pulsed partially coherent laser beam through the remainder of the optical path but a small fraction is directed into the wavefront sensor via a removable quarter waveplate 19 and corner cube array 21 for alignment and boresighting purposes (alignment and boresighting only occur infrequently and not during normal operation of the system). The majority of the light from the pulsed partially coherent laser beam is redirected up the optical path by the chromatic beam splitter 8C (which reflects the partially coherent laser beam), pre-corrected for turbulence by the phase correction device 17, converted from linear to circular polarization by the quarter wave plate 19, relayed by off-axis parabolic mirrors 22 to the steering mirror 12 and focused to the target 18 through the turbulent medium 14 by the telescope secondary mirror 15B and primary mirror 15A (there is no requirement for an off-axis telescope and the two mirror off-axis telescope shown could be replaced by innumerable superior telescope designs). The return of the pulsed partially coherent laser beam is then relayed back through the optical path, and converted back to linear polarization by the quarter wave plate 19, enabling the majority of the reflected beam to be directed through the polarizing plate beam splitter 8B and into the wavefront sensor. The wavefront sensor is comprised of an optical relay with off-axis parabolic mirrors 22 that directs the beam through an intensity beam splitter 8A that provides one sample of the beam to a high speed detector 13G which is configured to have a detector size approximately equal to the diffraction limited beam size and the remainder of the beam is passed through a custom filter 13F that rotates the polarization of the diffraction limited size center of the focused beam by 90 degrees (the filter 13F is illustrated in detail in FIG. 8(a) and is co-aligned so that the center of the filter 13F maps to the center of the detector 13G). The interference pattern produced by the filter 13F is directed into an assembly comprised of a quarter wave plate 19 aligned to the crystal axis of the custom filter 13F, half wave plates 19A, polarizing beam splitters 8B, and flat mirrors 13E to direct two complimentary interference patterns onto the detector array 13D. The laser beams on the camera are illustrated by way of example in FIG. 8(b). The high speed detector 13G and detector 13D are time synchronized with the pulsed partially coherent laser so that they integrate only the return beam from the target. The high speed detector 13G is used to control the steering mirror 12 and low order modes of the phase correction device 17 using a multi-dither or stochastic parallel gradient descent technique. The intensity patterns on the detector array 13D are differenced to produce a signal proportional to the gradient of the local fringe intensity. This plurality of signals, mapping one to one to the correction channels of the phase correction device 17 is used to control the phase correction device 17. A passive or broad illumination (from an auxiliary transmitter) of the target is sample by the chromatic beam splitter 8C and focused by an achromatic lens 20B onto the imaging/tracking camera 20A. The data from the imaging/tracking camera is used to control the steering mirror 12A and steering mirror 12B. The entire process leads to pre-compensated of the scoring laser 10D which is injected via the steering mirror 12B and chromatic filter 8C and compensation of the image observed on the imaging/tracking camera 20A. The addition of the scoring laser is not required if only compensated imaging is desired.

FIG. 8(*a*) is a schematic of an example of a filter used to obtain fringe patterns for measurement by the wavefront sensor. The filter is used to form interference patterns. The central region imparts a 90 degree rotation of the polarization whereas the outer region is path length matching glass. The filter is comprised of a thin glass substrate 22A with a central diffraction limited size half wave plate 22B that rotates the polarization by 90 degrees.

FIG. 8(*b*) is a schematic illustrating the two laser beams on the detector array. The wavefront sensor optics are arranged to place the two beams onto the detector with separation to enable measurement of both interference patterns. FIG. 8(*b*) illustrates by example the arrangement of the two beams on the detector array 13D. The beams are side by side and are represented as a nominal interference pattern 23A and the half wave shifted interference pattern 23B. The pixels of the detector array 24 map approximately one to one to the control channels of the phase correction device 17.

FIG. 9(*a*) is a schematic of one mask or beam re-shaping pattern option for the partially coherent beacon laser. In this option the full aperture is used (i.e. no mask or beam re-shaping optics). In this option the full aperture 25 is used (i.e. no mask or beam re-shaping optics).

FIG. 9(*b*) is a schematic of one mask or beam re-shaping option for the partially coherent beacon laser. In this option the outer ring of the aperture 25 is used and the inner part of the aperture 25A is obscured/not used.

FIG. 9(*c*) is a schematic of one mask or beam re-shaping option for the partially coherent beacon laser using four small projected beams. FIG. 9(*c*) is a schematic of one mask or beam re-shaping option for the partially coherent beacon laser. In this option four small beams 25B are projected near the edge of the transmit aperture 25.

Figure 10:
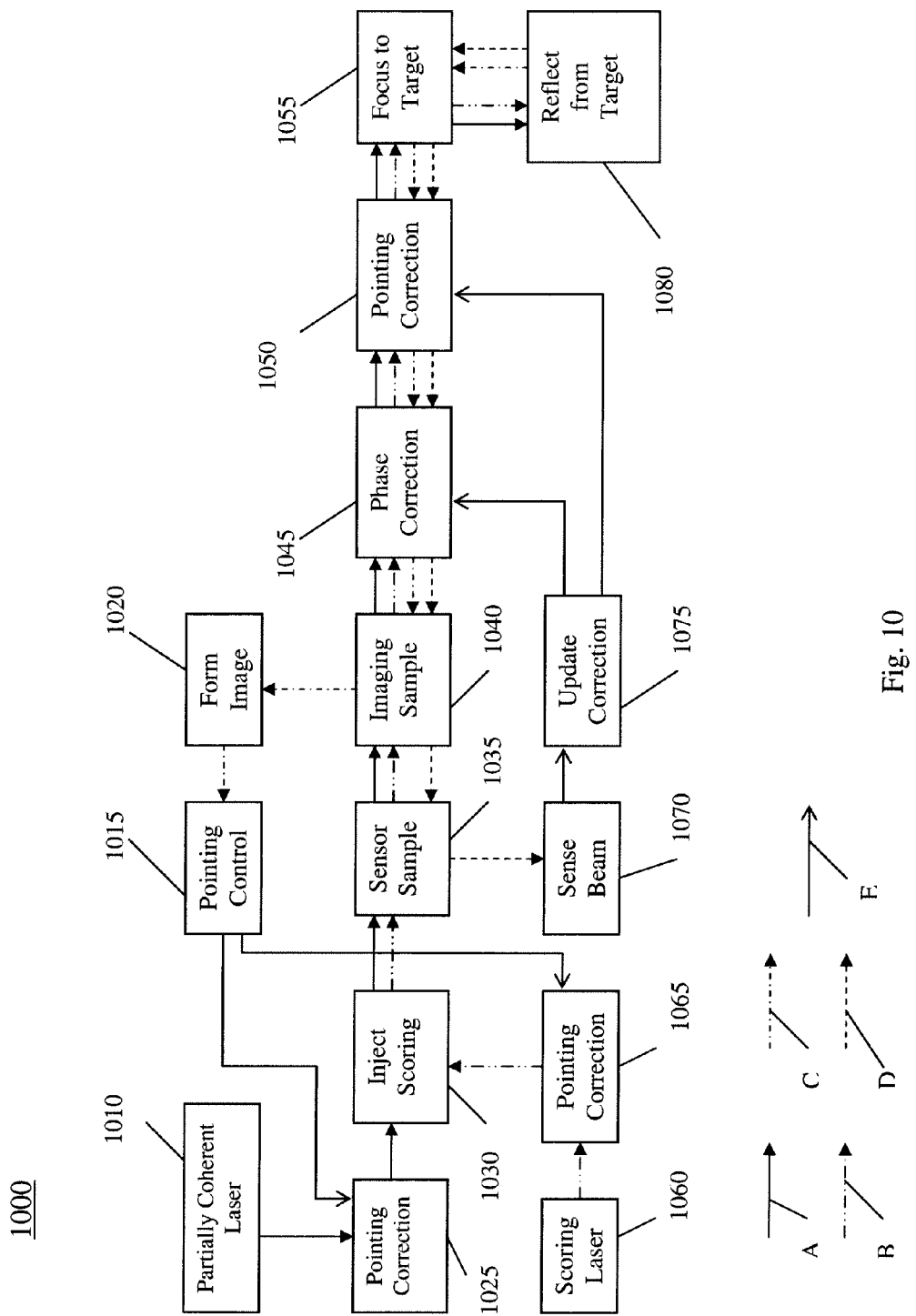
FIG. 10 is a flow chart of the general purpose BCAO system of the present invention.

FIG. 10 is a flow chart of the general purpose BCAO system of the present invention. In FIG. 10, the solid arrow 'A' represents propagation of the partially coherent laser beacon beam, the dash-dot-dot arrow 'B' represents propagation of the scoring laser beam, the dash-dot arrow 'C' represents light from the target (either passive or active full target illumination), the dashed arrow 'D' represents return of the partially coherent laser from the target, and the solid, but open head arrow 'E' represents electronic control signals. In step 1010 a partially coherent laser sends a signal and, in step 1025, is corrected for pointing errors by a steering mirror, and passes through a beam splitter for scoring laser injection, step 1030. In step 1035 a beam splitter samples the return of the partially coherent laser, and, in step 1040 a beam splitter for sampling passive or active full target illumination for imaging and tracking is applied. The partially coherent laser is then pre-corrected for higher order aberrations by the phase correction device, step 1045 and corrected for fine tracking errors, step 1050. The partially coherent laser is then focused by the telescope, step 1055, to the target in step 1080. A reflected return from the target then passes back through the telescope, step 1055 which re-collimates the return beam and passes through the pointing correction, step 1050, and phase correction systems, step 1045. After passing through the beam splitter for the imaging system, step 1040, the return is reflected by the sensor sample process in step 1035 to the wavefront sensor for sensing the beam, step 1070. The sensor signals are used to update control commands, step 1075, that maximize the coherence of the wavefront over the spectral band via process, which then generates control commands for the phase correction device, step 1045 and fine pointing system, step 1050. The full illumination of the target reflection, step 1080, is received by the telescope, step 1055, corrected for turbulence by the pointing, step 1050 and phase correction processes step 1045, and then sampled in step 1040 for the imaging system, step 1020. The image is processed to compute pointing commands, step 1015 for the outgoing partially coherent laser and for the scoring laser. The scoring laser step 1060, which is the laser that needs to be corrected for the effects of turbulence, is corrected for pointing errors, step 1065, and then injected into the optical path, step 1030. After passing through the sensor sampling beam-splitter in step 1035 and the imaging sampling beam-splitter in step 1040, the scoring laser is pre-corrected for the effects of turbulence by the phase correction device, step 1045, and the pointing correction device, step 1050. In step 1055, the telescope then focuses the scoring laser beam to the target, step 1080.

FIG. 11 is a flow chart of the preferred embodiment of the BCAO system of the present invention. In FIG. 11, the arrow representation is as described above in FIG. 10. A partially coherent laser, step 1010 is corrected for pointing errors by a steering mirror, step 1025, passes through a beam splitter for scoring laser injection, step 1030, then a beam splitter for sampling the return of the partially coherent laser, step 1035, and a beam splitter for sampling passive or active full target illumination for imaging and tracking, step 1040. The partially coherent laser is then pre-corrected for higher order aberrations by the phase correction device in step 1045 and corrected for fine tracking errors, step 1050. In step 1055, the partially coherent laser is then focused by the telescope to the target, step 1080. In step 1055, a reflected return from the target then passes back through the telescope which re-collimates the return beam and passes through the pointing correction, step 1050 and phase correction, step, systems. After passing through the beam splitter for the imaging system, step 1040, the return is reflected by the sensor sample process, step 1035 to the wavefront sensor. The wavefront sensor starts by focusing the beam, step 2010, and before reaching focus a sample of the beam, step 2015, is directed to a high speed detector that measures the power in a diffraction limited size area of the beam, step 2060. This high speed signal is used to determine the change in the metric (determine gradient step 2065) $J_{PIB}$ due to a set of modal command patterns applied to the phase correction device. Step 2070 uses the gradient information to update the modal control command. Returning to the primary wavefront sensing beam after sampling in step 2015, the beam is filtered, step 2020, using a diffraction limited size waveplate at the focal plane that rotates the central diffraction limited size part of the beam 90 degrees. The beam is then collimated, step 2025, and 2 fringe patterns, step 2030, are formed and measured, step 2035. The difference of the fringe patterns, step 2040 is proportional to the derivative of the coherence function over the region of a control channel and hence can be used as the control signal to maximize the coherence on each control channel, step 2045. The modal and fine control signals are summed in step 2050 and a perturbation is added to the phase correction device in step 2055. The information of the perturbation used is provided to the gradient computation process, step 2065. The final summed signal is then used to control the phase correction device, step 1045, and the pointing correction, step 1050. The full illumination of the target reflection, step 1080, is received by telescope in step 1055, corrected for turbulence by the pointing error correction, step 1050 and phase correction, step 1045, processes, and then sampled in step 1040 for the imaging system formation, step 1020. The image is processed to compute pointing commands, step 1015 for the outgoing partially coherent laser and for the scoring laser. The scoring laser, step 1060, which is the laser that needs to be corrected for the effects of turbulence is corrected for pointing errors, step 1065 and then injected into the optical path, step 1030. After passing through the sensor sampling beam-splitter, step 1035 and the imaging sampling beam-splitter, step 1040, the scoring laser is pre-corrected for the effects of turbulence by the phase correction device in step 1045 and the pointing correction device, step 1050. The telescope, in step 1055, then focuses the scoring laser beam to the target, step 1080.

FIG. 12 is a table summarizing various embodiments of the invention. It should be noted that the embodiments are presented by way of example and not of limitation. The methods of FIG. 5 and FIG. 10 combine to form a primary class of embodiments that utilize pre-compensation of the partially coherent laser. There are no limitations on the type of beam transfer optics, beam steering device, or phase correction device. Any wavefront sensing and control algorithm approach that maximizes the average or weighted average of the complex field over wavelength is suitable. The masking of the outgoing partially coherent laser is considered an optional enhancement of the present invention and may improve performance in some situations. The methods of FIG. 6 and FIG. 10 combine to form a primary class of embodiments that do not utilize pre-compensation of the partially coherent laser. There are no limitations on the type of beam transfer optics, beam steering device, or phase correction device. Any wavefront sensing and control algorithm approach that maximizes the average or weighted average of the complex field over wavelength is suitable. The masking of the outgoing partially coherent laser is considered an optional enhancement of the present invention and may improve performance in some situations. The methods of FIGS. 7, 8, and 11 combine to form the current understanding of the preferred embodiment which does utilize pre-compensation of the partially coherent laser beacon. The beam transfer optics should be all reflective to ensure achromaticity. Reflective steering mirror(s) are used as well as a continuous facesheet deformable mirror. FIGS. 7 and 8 describe a combined differential Zernike filter and on-axis diffraction limited power meter that is integrated with the control algorithm described by FIG. 11. The masking of the outgoing partially coherent laser is considered an optional enhancement of the present invention and may improve performance in some situations.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. An electro-optical pre-compensating system for forming a near diffraction limited size beacon at a non-cooperative target, the system comprising:

A) a near diffraction limited beacon-to-target transmission path comprising;
a) a pulsed partially coherent laser beam;
b) a steering mirror(s);
c) a chromatic filter;
d) one or more relay off-axis parabolic mirrors;
e) a polarizing plate beam splitter;
f) wherein the pulsed partially coherent laser beam is directed through the steering mirror(s), the chromatic filter and the one or more relay off-axis parabolic mirrors to the polarizing beam splitter which functions to direct a majority of the pulsed partially coherent laser beam through the beacon-to-target transmission path;
g) a removable quarter waveplate;
h) a corner cube array;
i) wherein the polarizing beam splitter directs a small fraction of the pulsed partially coherent laser beam to a wavefront sensor via the removable quarter waveplate and the corner cube array thereby functioning to align and boresight the pulsed partially coherent laser beam;
j) a phase correction device;
k) wherein the majority of pulsed partially coherent laser beam goes to the phase correction device functioning to pre-correct the majority pulsed partially coherent laser beam for turbulence;
l) a quarter waveplate;
m) wherein the majority pulsed partially coherent laser beam then passes through the quarter waveplate functioning to convert the majority pulsed partially coherent laser beam from linear to a circular polarization;
n) an off-axis parabolic mirror(s);
o) wherein the majority pulsed partially coherent laser beam then passes through the off-axis parabolic mirrors functioning to relay the majority pulsed partially coherent laser beam to one of the steering mirrors;
p) wherein the majority of the pulsed partially coherent laser beam then passes through a turbulent medium in the beacon-to-target transmission path;
q) wherein the steering mirrors direct the majority pulsed partially coherent laser beam to the target through a telescope secondary and primary mirror and through the turbulent medium;

B) a target beam reflection path comprising;
a) a reflected pulsed partially coherent laser beam;
b) wherein the reflected pulsed partially coherent laser beam is relayed back through the transmission path;
c) wherein the reflected pulsed partially coherent laser beam is converted back to linear polarization by the removable quarter wave plate;
d) wherein the a reflected pulsed partially coherent laser beam is then directed through the polarizing beam splitter and into the wavefront sensor;
e) wherein the wavefront sensor using an optical rely and off-axis parabolic mirrors direct the reflected pulsed partially coherent laser beam through an intensity beam splitter to provide one sample of the reflected pulsed partially coherent laser beam to a high speed detector;
f) wherein the high speed detector is configured to have a detector size about equal to the diffraction limited beacon;
g) wherein the remainder of the reflected pulsed partially coherent laser beam passes through a custom filter functioning to rotate the polarization by 90 degrees;
h) and wherein the custom filter is co-aligned to map the center of the custom filter to the center of the high speed detector functioning to create an interference pattern;
i) wherein the interference pattern is directed to an assembly of the quarter wave plate aligned to the crystal axis of the custom filter, half wave plates, polarizing beam splitters and flat mirrors functioning to direct two complimentary interference patterns to a detector array;
j) wherein the high speed detector and the detector array are then synchronized with the reflected pulsed partially coherent laser beam so that they integrate forming only one return beam from the target;

k) wherein the high speed detector functions to control a steering mirror of the phase correction device using a multi-dither or stochastic parallel gradient descent technique;

l) wherein the intensity patterns on the detector array are differenced functioning to produce a signal proportional to the gradient of a local fringe intensity;

m) wherein the a plurality of signals mapping one to one to the correction channels of the phase correction device are used to control the phase correction device;

n) wherein a passive or broad illumination of the target is sampled by a chromatic beam splitter, focused by an achromatic lens onto an imaging/tracking camera functioning to gather data to control the steering mirrors; and o) wherein the above described transmission and reflection paths result in pre-compensation of the pulsed partially coherent laser beam functioning to keep the laser beam pointed at the target.

2. The apparatus of claim 1, wherein the chromatic filter further comprises a thin glass substrate with a central diffraction limited size half wave plate functioning to rotate the polarization by 90 degrees.

3. The apparatus of claim 1, wherein the detector array receives the pulsed partially coherent laser beam and the reflected pulsed partially coherent laser beam in a side by side manner functioning to control the steering mirror and low order modes of the phase correction device.

4. The apparatus of claim 2, wherein intensity patterns on the detector array are differenced to produce as signal proportional to the gradient of local fringe intensity.

5. An electro-optical pre-compensating method for forming a near diffraction limited size beacon at a non-cooperative target, the method comprising the steps of:

a) forming a steering mirror to correct a partially coherent laser for pointing errors;

b) passing the partially coherent laser through a beam splitter for a scoring laser beam injection;

c) using a beam splitter for sampling passive or active full target illumination for imaging and tracking;

d) using a phase correction device to pre-correct the partially coherent laser for higher order aberrations followed by a correction for fine tracking errors;

e) focusing the partially coherent laser via a telescope to the end target;

f) passing the reflected pulsed partially coherent laser beam back through the telescope which re-collimates the reflected pulsed partially coherent laser beam and passes it through the pointing correction and phase correction;

g) passing the reflected pulsed partially coherent laser beam through the beam splitter and reflected by the sensor sample process to the wavefront sensor;

h) using the wavefront sensor to focus the reflected pulsed partially coherent laser beam and to direct a sample of the reflected pulsed partially coherent laser beam to a high speed detector functioning to measure the power in a diffraction limited size area sampled beam;

i) using the sample of the reflected pulsed partially coherent laser beam to determine the metric gradient $J_{PIB}$ due to a set of modal command patterns applied to the phase correction device, the metric defined as, $$J_{PIB} = \int_{\lambda_{min}}^{\lambda_{max}} d\lambda \left| \frac{1}{\lambda f} \int_{Bucket} d\vec{r}' \int_{Aperture} d\vec{r} U(\vec{r}, \lambda) \exp\left(-i\frac{2\pi}{\lambda f}\vec{r}\cdot\vec{r}'\right) \right|^2$$

j) using the gradient information to update a modal control command to a modal signal;

k) using the wavefront sensor to send a sample of the reflected pulsed partially coherent laser beam to a filter and using a diffraction limited size waveplate at the focal plane to rotate the central diffraction limited size part of the reflected pulsed partially coherent beam by 90 degrees, collimating the sample of the reflected pulsed partially coherent beam, forming and measuring two fringe patterns, using the difference in the fringe patterns, being proportional to the derivative of the coherence function over the region of a control channel, as a fine control signal functioning to maximize the coherence on each channel;

l) summing the modal signal and the fine control signals and adding a perturbation to a phase correction device and providing the perturbation information to the metric gradient computation process ($J_{PIB}$);

m) using the final summed signal to control the phase correction device and the pointing correction;

n) receiving the full illumination of the reflected pulsed partially coherent laser beam by the telescope, correcting for turbulence by the pointing error correction and then sampling the corrected reflected partially coherent laser beam;

o) passing the corrected reflected pulsed partially coherent laser beam through the beam splitter, reflecting the sample of the corrected reflected partially coherent laser beam to the wavefront sensor and using the sample of the corrected reflected partially coherent laser beam to update the control commands to maximize the coherence of the wavefront over the spectral band generating control commands for the phase correction device and fine pointing correction system;

p) receiving the full illumination of the reflected pulsed partially coherent laser beam by the telescope, correcting the full illumination of the reflected pulsed partially coherent laser beam for turbulence by the pointing correction system and phase correction processes, and sampling the full illumination of the reflected pulsed partially coherent laser beam for the imaging system;

q) processing the reflected pulsed partially coherent laser beam image to compute pointing commands for the outgoing partially coherent laser and the scoring laser, correcting the scoring laser for pointing errors and injecting the scoring laser beam into the optical path;

r) passing the scoring laser beam through the sensor sampling beam-splitter and imaging sampling beam-splitter and pre-correcting the scoring laser beam for the effects of turbulence by the phase correction device and the pointing correction device; and s) joining the pre-corrected scoring laser beam with the pulsed partially coherent laser beam at the telescope functioning to focus both beams to the target.

* * * * *